(12) United States Patent
Li et al.

(10) Patent No.: US 7,616,576 B2
(45) Date of Patent: Nov. 10, 2009

(54) METHOD AND APPARATUS FOR PATH SELECTION IN TELECOMMUNICATION NETWORKS

(75) Inventors: Lei Li, Beijing (CN); Yangchun Li, Guangzhou (CN); Hitoshi Yamada, Kanagawa (JP); Xun Chen, Guangzhou (CN)

(73) Assignees: Fujitsu Limited, Kawasaki (JP); Guangdong Telecom Academy of Science and Technology, Guangzhou (CN)

( * ) Notice: Subject to any disclaimer, the term of this patent is extended or adjusted under 35 U.S.C. 154(b) by 546 days.

(21) Appl. No.: 11/230,286

(22) Filed: Sep. 19, 2005

(65) Prior Publication Data

US 2006/0067217 A1    Mar. 30, 2006

(30) Foreign Application Priority Data

Sep. 30, 2004  (CN)  ........................ 2004 1 0083127

(51) Int. Cl.
*G01R 31/08* (2006.01)

(52) U.S. Cl. ...................................... 370/238

(58) Field of Classification Search ................. 370/238, 370/230, 237, 229, 254, 389, 392; 709/239, 709/240, 241, 238
See application file for complete search history.

(56) References Cited

U.S. PATENT DOCUMENTS

| | | | |
|---|---|---|---|
| 6,201,810 B1 * | 3/2001 | Masuda et al. | 370/395.32 |
| 6,363,319 B1 * | 3/2002 | Hsu | 701/202 |
| 6,400,681 B1 * | 6/2002 | Bertin et al. | 370/218 |
| 6,594,268 B1 * | 7/2003 | Aukia et al. | 370/400 |

\* cited by examiner

*Primary Examiner*—Kwang B Yao
*Assistant Examiner*—Anh Ngoc Nguyen
(74) *Attorney, Agent, or Firm*—Katten Muchin Rosenman LLP

(57) ABSTRACT

This invention provides a method and an apparatus for selecting path in a telecommunication network. In the invention, a control strategy parameter is generated based on a control strategy, and a network condition parameter is generated based on the condition of the network, a path cost for each of a plurality of candidate paths is calculated based on the control strategy parameter and the network condition parameter, then a path with the minimal path cost is selected from among the candidate paths.

13 Claims, 4 Drawing Sheets

METHOD AND APPARATUS FOR PATH SELECTION IN TELECOMMUNICATION NETWORKS

TECHNICAL FIELD

This present invention relates to method and apparatus for path selection in telecommunication networks, specifically to a method and apparatus for path selection based on control strategies and network conditions.

BACKGROUND ART

Multi-Protocol Label Switching (MPLS) supports explicit paths, and routes packets through the explicit paths. Explicit paths can be designated by Ingress nodes. The key to implementing MPLS traffic engineering is to select suitable paths to balance the network load, to optimize network resource utilization and traffic performance. For load balancing, sometimes it is necessary to select a long path. These paths are not necessarily minimum-hop paths. Nowadays, the common problem for all path selection schemes is how to make a tradeoff between limiting hop number and load balancing. Current researches reveal that, for traffics that require bandwidth guarantee, the path selection can be divided into two cases based on the network load: when the network load is heavy, priority is given to hops limitation, and when the network load is light, priority is given to load balancing, while the hops limitation becomes a minor factor. However, for "best-effort" traffic, load balance is always beneficial, for balanced load means all available paths can be utilized fully, and the throughput of network can be maximized.

Therefore, tradeoff between hops limitation and load balance (available bandwidth) should be based on network condition and service requirements. However, the conventional methods, e.g., "short-widest", "widest-shortest" and "shortest-distance", can only provide static tradeoff. The "shortest-widest" algorithm selects paths by firstly selecting the path(s) having the maximal available bandwidth among all available paths, then selecting the path having the minimal hops, if there are more than one path having the same available bandwidth. The "widest-shortest" algorithm similarly take the available bandwidth into account only when there are more than one path having the same hops. While in the "shortest-distance" algorithm, the tradeoff between hops limitation and load balance is made entirely based on a link cost function. The shortcoming of these method is that the network operators cannot control traffic engineering based on network conditions and service requirements. More important, the administrative policies of the network operators cannot be incorporated into the traffic engineering.

SUMMARY OF THE INVENTION

The invention is proposed in view of the problems existing in the above prior art.

An object of the invention is to provide a simple and efficient path selection technology for MPLS traffic engineering, and to control traffic based on network condition, service requirements and administrative policies.

According to the object of the invention, an aspect of the invention provides a path selection method for optimizing utilization efficiency of the network resource and the service performance. The method comprises steps of: (a) defining a control strategy, and generating a control strategy parameter Util_weight based on the control strategy; (b) generating a network condition parameter based on the condition of the network; (c) calculating a path cost for each of a plurality of candidate paths based on the control strategy parameter, the network condition parameter, and network topology information; and (d) selecting a path with the minimal path cost from among the candidate paths.

Another aspect of the invention provides an apparatus for selecting path in a telecommunication network, comprising: a control strategy parameter generating means for generating a control strategy parameter Util_weight based on control strategies; a network condition parameter generating means for generating a network condition parameter based on the condition of the network; a path cost calculating means for calculating a path cost for each of a plurality of candidate paths based on the control strategy parameter, the network condition parameter and network topology information; and a path determining means for selecting a path with the minimal path cost from among the candidate paths.

The invention allows the network operators to define their own traffic control strategies, and facilitates the network operators to deploy different strategies over a common traffic control platform.

In the invention, the control strategies would not increase the computation complexity of the routing algorithm, which is maintained to the same level as the standard Dijkstra algorithm.

Based on different control strategies, the invention can be applied to routing of two types of traffic: QoS traffic requiring bandwidth guarantee, and Best-Effort traffic. The switching between control strategies is very simple and efficient.

BRIEF DESCRIPTION OF THE DRAWINGS

The features and advantages of the invention will become more apparent through the following detailed description, in conjunction with the drawings.

DESCRIPTION OF THE EMBODIMENTS

The present invention provides a strategy-based path selection method and apparatus for calculating explicit routes of MPLS label switched path (LSP). The invention addresses the problem of controlling traffic engineering based on condition of the network, service requirements and the administrative policies, including defining control strategies and applying the strategies to the path selection.

The path selection apparatus of the invention can either be embodied in a web server in an integrated mode, or be embodied in the individual label edge router (LER) in a distributed mode. The path selection apparatus of the invention can be easily implemented based on the principle of the invention.

Figure 2A:
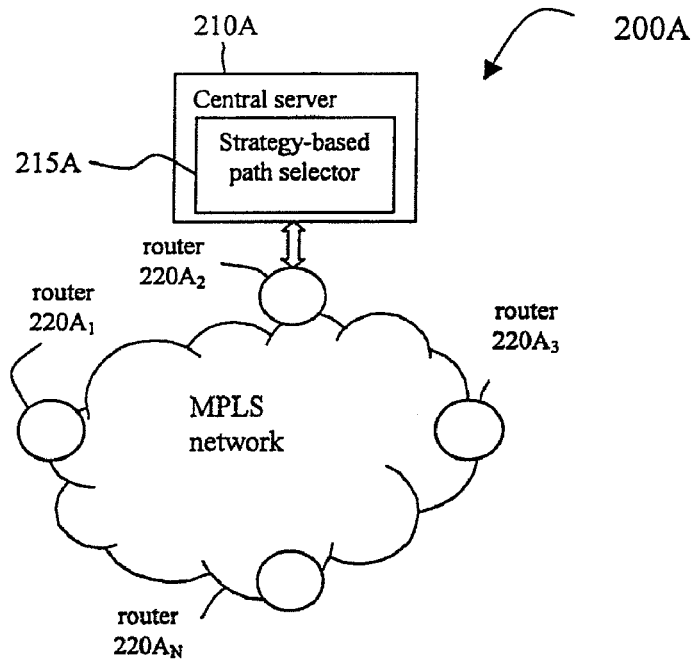
FIG. 2A is a schematic diagram illustrating the implementation of strategy-based path selection by using a central control server.

FIG. 2A is a schematic diagram of the system 200A. In this system, the path selection apparatus of the invention is embodied in a central control server. The system 200A comprises a central control server 210A and routers $220A_1$ to $220A_N$. Server 210A comprises a path selector 215A, which is the path selection apparatus of the invention. Path selector 215A calculates routes based on control strategies and distributes the routes to routers $220A_1 \sim 220A_N$. $220A_1 \sim 220A_N$ are edge routers of the entire MPLS network, for setting up explicit paths based on the distributed routes, and routing the packets via these paths.

Figure 2B:
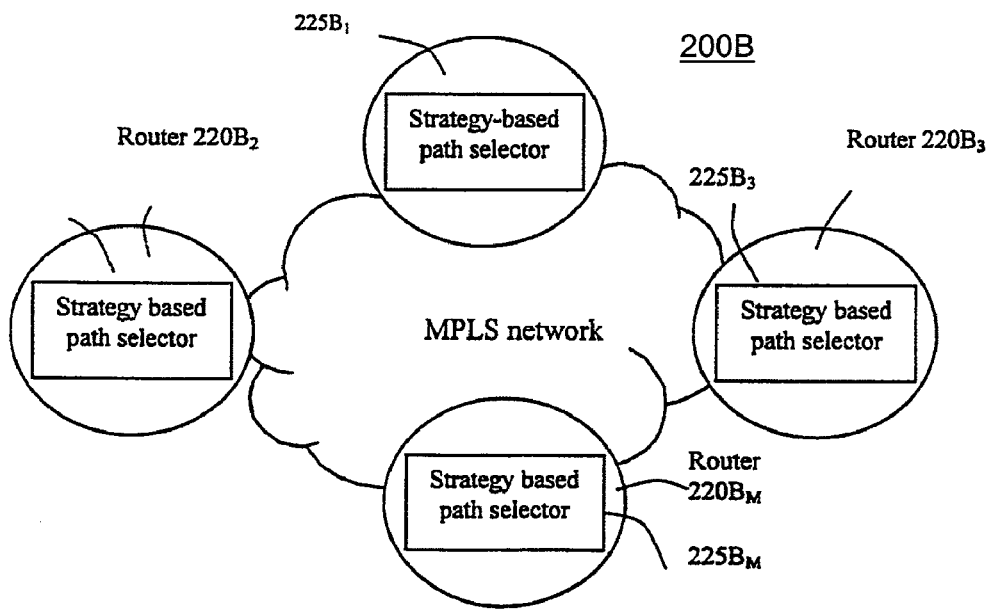
FIG. 2B is a schematic diagram illustrating the implementation of strategy-based path selection by using a local path selector.

FIG. 2B is a schematic diagram of system 200B. In this system, the path selection apparatus of the invention is embodied in an edge router. System 200B comprises routers $220B_1$ to $220B_M$. These routers are edge routers of the whole network. Each router employs a local strategy-based path selector $225B_i$, which is the path selection apparatus of the invention. The local strategy-based path selectors calculate routes based on condition of the network and control strategies. The edge routers set up explicit paths based on the routes calculated by the path selector, and route packets through these paths.

Next, the path selection apparatus and path selection method of the invention will be described in detail.

Figure 1:
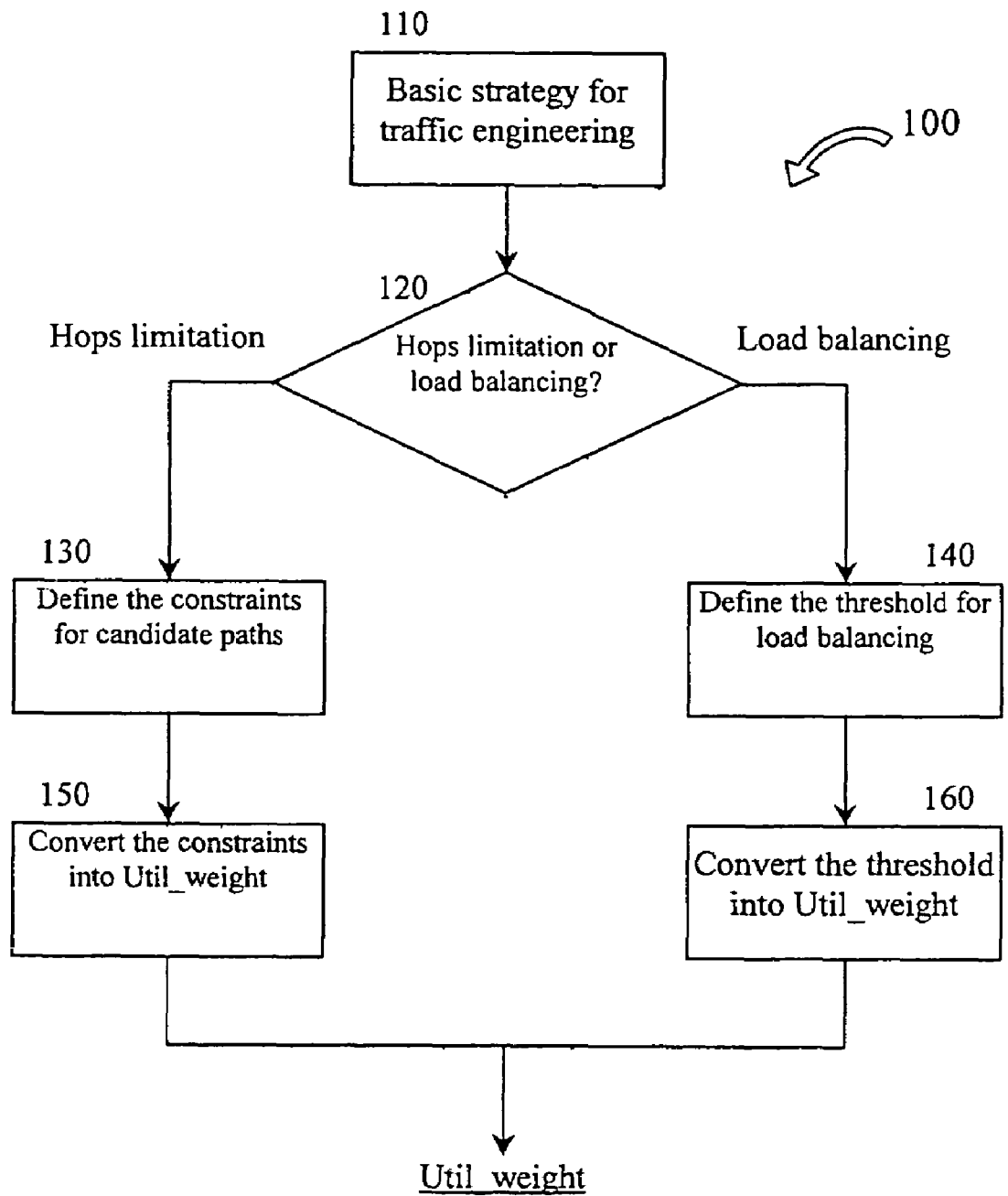
FIG. 1 is a flowchart illustrating the process for defining control strategies in the invention.

First, the process of defining control strategies will be described. The flowchart of FIG. 1 illustrates the process of defining control strategies. First, in Step 110, the basic policy for traffic engineering is defined based on service requirements. If the traffic engineering is for traffic with performance requirements, the control strategy employs QoS routing for load balancing, and for meeting the performance requirements of the traffic. If the traffic engineering is for best-effort traffic, the control strategy for traffic engineering employs a dynamic load balancing scheme in order to optimize the network throughput, while the requirements for service performance are not taken into consideration. Next, in Step 120, a tradeoff between hops limitation and load balance is made according to the basic policy for traffic engineering defined in Step 110. For the QoS routing scheme requiring load balance, the hops limitation is the factor to be considered first. The reason is that a long path occupies extra network resources, possibly resulting in failure of setting up new connections for out of available resources. For the dynamic load balancing, "rebalancing" is a major factor to be considered, in order to decrease the maximal link utilization. In dynamic load balancing, there is not a limit for hops in routing of the traffic to be balanced. Finally, the process proceeds into two branches according to different tradeoff consideration.

If it is necessary to limit number of hops, the process proceeds to Step 130 to define constraint conditions for path selection based on network topology and service requirements. The constraint conditions include length of path and load condition. These constraint conditions are converted to parameter "Util_weight" in the control strategy parameter generating means 310 as described below.

If load balance is the preferred factor, the process proceeds to Step 140 to define a threshold for link utilization. If the utilization of a part of links exceeds the threshold, LSPs over these links are considered "congested". The load on these congested LSPs are balanced to other paths. In Step 160, the threshold is converted into parameter "Util_Weight" in the control strategy parameter generating means 310. Through the steps shown in FIG. 1, the control strategies are converted to control parameter "Util_weight".

Figure 3:
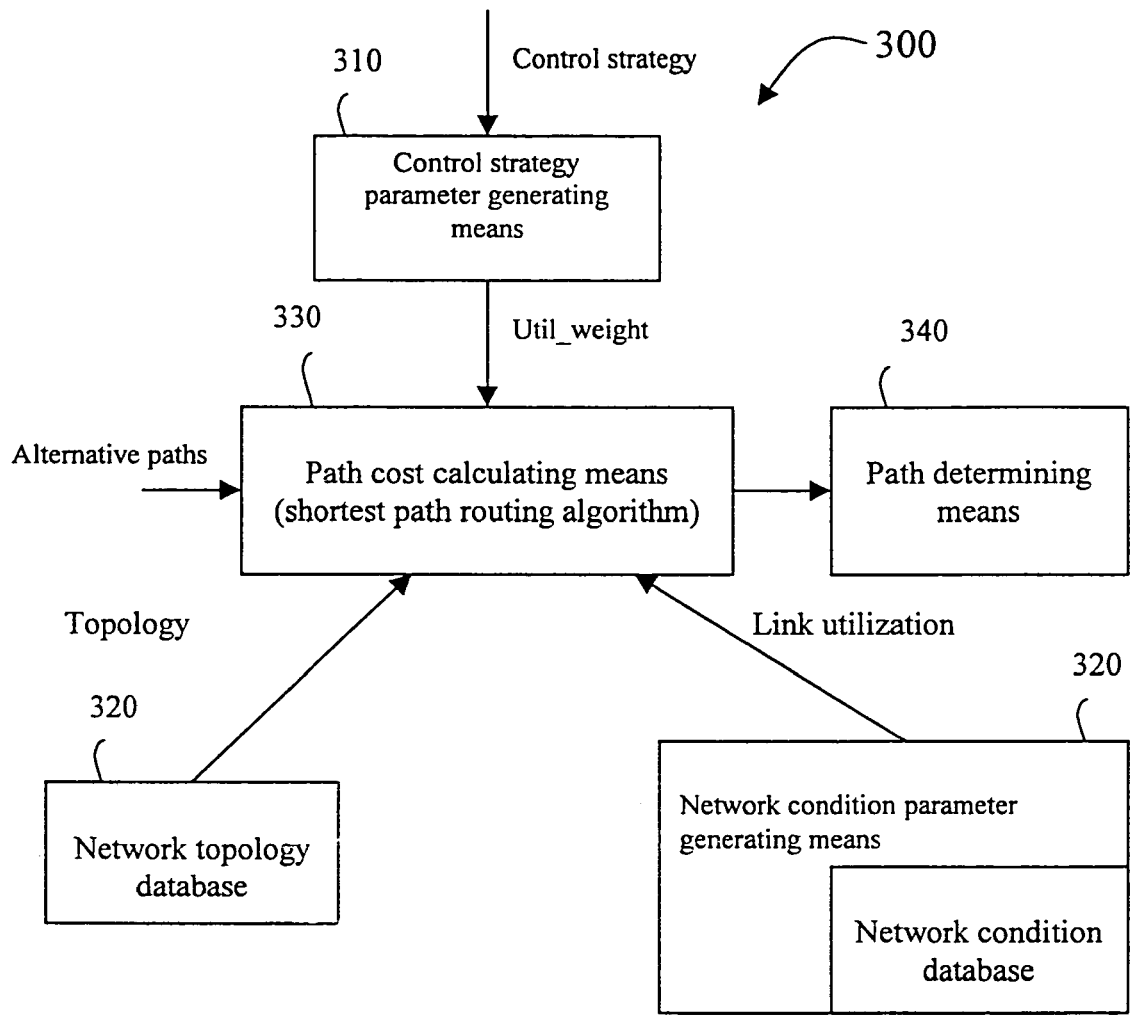
FIG. 3 is a system block chart of an illustrative strategy-based path selector.

FIG. 3 is a schematic block diagram of path selection apparatus 300 according to an embodiment of the invention. As show in FIG. 3, path selection apparatus 300 comprises: control strategy parameter generating means 310 for generating control strategy parameters based on control strategies, network condition parameter generating means 320 for generating network parameters based on the condition of the network, path cost calculating means 330 for calculating path cost of each candidate path based on the control strategy parameter and the network condition parameter, and path determining means 340 for determining a path with the minimal cost from among the candidate paths. The path selection method of the invention is embodied in the path selection apparatus 300 of the invention.

In path selection apparatus 300, control strategy parameter generating means 310 generates control strategy parameter Util_weight based on the control strategies as defined above. The operator may input the control strategies into the control strategy parameter generating means 310 through various input means, such as, by means of keyboard or graphic interface, or by means of file. Control strategy parameter generating means 310 generates control strategy parameter Util_weight based on control strategies in a manner as described below. Path cost calculating means 330 calculates the cost of all candidate paths based the information of the following three aspects.

1. network topology information stored in a network topology database;
2. link condition information in a link condition database;
3. control strategy information provided by Util_weight.

After path cost calculating means 330 calculates the costs of all candidate paths, path determining means 340 selects a path with the minimal cost as the best path.

If the path selection apparatus 300 is embodied in the central web server, as shown in FIG. 2A, the network topology database can be input from a network administration system or be input manually. This server may further maintain a network condition database. This database stores network statistic data, such as link utilization or the like. These data are collected by SNMP or other network monitoring tools. Thus, network condition parameter generating means 320 of the invention is constructed.

If the path selection apparatus 300 is embodied in individual edge routers, as shown in FIG. 2B, the network topology database and the network condition database are link condition database of routing protocol (such as OSPF-TE or IS-IS-TE) for traffic engineering. Thus, the network condition parameter generating means 320 of the invention is constructed.

In the invention, Util_weight is incorporated into the cost calculation for link and path as a proportional factor. In this case, different ingress-egress pairs apply different control strategies by using different Util_weight.

The path selection of the invention will be described in more detail.

The objective of strategy-based path selection is to apply the control strategies desired by the network operator to the MPLS traffic engineering through control of path selection. The control strategies are defined by the operator based on network topology, the service requirements and the administrative policies. With appropriate control strategies, the strategy-based path selection method can support QoS routing for traffic with service requirements and dynamic load balancing for best-effort traffic.

The basic concept of the strategy-based path selection method of the invention is applying the "Util-weight" to link cost calculation as a proportional factor for link utilization. The link cost is calculated by:

$$C_{link} = \frac{1}{1 - \text{Util\_weight} \times U_{link}} \quad (\text{Util\_weight} \geq 0)$$

where $C_{link}$ is the link cost, $U_{link}$ is link utilization.

The First Embodiment

The first embodiment of the invention will be described in detail.

In the 1st embodiment, the strategy-based path selection method for QoS routing is implemented in the path selection apparatus of the invention.

First, the application of the invention to traffic requiring bandwidth guarantee (QoS routing) is described. In QoS routing, when the minimal-hop path does not have sufficient bandwidth to meet the bandwidth requirement of the traffic, usually a longer path is selected to route the traffic. The previous study reveals that the longer path will occupy more network resource, thus affecting allocation of available paths to new traffics. Therefore, RFC2386 proposes that when allocating resources to traffic of a connection, the overall condition of resource allocation should be considered. The principle for determining whether resource is allocated to a connection is that, considering the loss caused by possible refusal of other traffics requiring the same resource, the "cost" for routing a traffic with a certain QoS should not exceed the gained profit. The goal of such "high level admission control" mechanism is to ensure that the network cost incurred by routing QoS traffic will not exceed the gained profit. As an application of the invention, the strategy-based path selector implements "high level admission control" to select an appropriate path based on the condition of network and the control strategies, by using the Util_weight parameter.

When the invention is applied to QoS routing, the maximal link utilization is determined for each available path. The maximal link utilization in a path is set as utilization for all links in the path.

When the network is idle, the hop number of the minimal-hop path in an ingress-egress pair is n. The maximum value of the cost of this path is $$C_{\min\_hop} = \frac{n}{1 - \text{Util\_weight}} = n + \frac{\text{Util\_weight}}{1 - \text{Util\_weight}} \times n$$

For this ingress-egress pair, there exists an candidate path, the hop number of which is n+m (m≧0). When the candidate path has no load, the cost is minimal, i.e., (m+n). The condition for this path to be utilized in load balancing is that its cost is smaller than or equal to the cost of the minimal-hop path. Thus the upper limit for extra hops of an acceptable candidate path can be determined in the equation below:

$$m \leq \frac{\text{Util\_weight}}{1 - \text{Util\_weight}} \times n$$

If an candidate path exists with a maximal link utilization of U, the condition for this candidate path to be selected is:

$$\frac{m+n}{1 - \text{Util\_weight} \times U} \leq \frac{n}{1 - \text{util\_weight}}$$

Therefore the upper limit for maximal link utilization of an candidate path is:

$$U_{max} \leq 1 - \frac{\text{Util\_weight}}{n \times \text{Util\_weight}} \times m$$

The condition for qualifying an candidate path can be set based on path length with the inequation for m. The upper limit for maximal link utilization of each candidate path can be set with the inequation for $U_{max}$. These upper limits can be controlled in accordance with control strategies, by adjusting the value of Util_weight. The value of Util_weight is set with the following equation:

$$\text{Util\_weight} = \frac{m}{(m+n) - n \times U_{max}}$$

where n is the number of hops of the minimal-hop path, $m \geq 0$, $0 \leq U_{max} < 1$. With this Util_weight, the cost of an candidate path with number of hops being n+m, maximal link utilization being $U_{max}$ is equal to the maximal value of the cost for minimal-hop path. The candidate path of this kind is referred to as the "worst" candidate path. It is assumed that there is one available path for an above described ingress-egress pair, which is referred to as Path A, the hops of which is (n+h) (h≧0), and the maximum link utilization is Z. With the Ulti_weight defined here, the cost of this path is:

$$\frac{n+h}{1 - \frac{m \times Z}{m+n - n \times U_{max}}} = \frac{n+h}{n+m} \times \frac{1}{1 - \frac{n \times U_{max} + m \times Z}{n+m}}$$

If path A is suitable for load balancing, its cost must be equal to or less than the maximal cost for the minimal-hop path, that is:

$$\frac{n+h}{n+m} \times \frac{1}{1 - \frac{n \times U_{max} + m \times Z}{n+m}} \leq \frac{n+m - n \times U_{max}}{1 - U_{max}}$$

If path A is longer than the "worst" candidate path, i.e., h>m, from the above equation, $$\frac{1}{1 - \frac{n \times U_{max} + m \times Z}{n+m}} < \frac{n+m - n \times U_{max}}{1 - U_{max}}$$

therefore $$\frac{n \times U_{max} + m \times Z}{n+m} < U_{max}$$

Hence, the upper limit for maximal link utilization in path A, i.e., Z<U, is determined. This shows that if an candidate path is longer than the "worst" path, it will be selected for load balancing only if its maximal link utilization is less than that of the "worst" path.

In short, with $U_{max}$ and m given, the range of length of candidate paths is limited to $$\left[ n, \frac{m}{1 - U_{\max}} \right].$$

For paths longer than n+m, the condition for them to be utilized in load balancing is that their maximal link utilization is less than $U_{max}$. With this scheme, the allocation of network resources is controlled.

Figure 4:
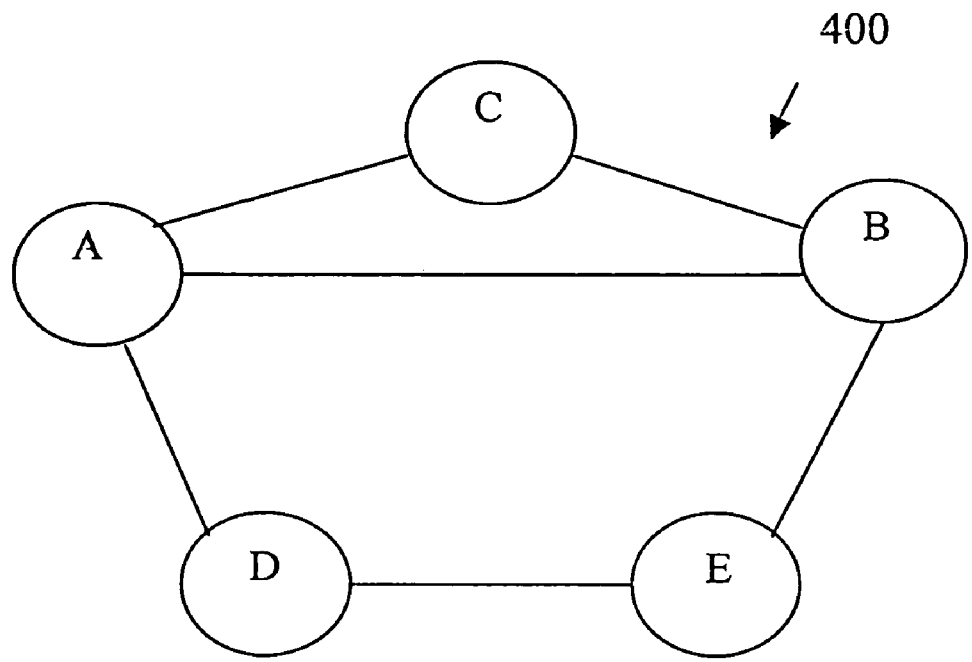
FIG. 4 illustrates an application of the invention where the control strategy is applied to path selection for QoS traffic requiring bandwidth guarantee.

FIG. 4 shows an example application of the present invention where load balancing is controlled based on control strategies. The traffic flows from node A to node B. By default, all traffics between this pair are transferred via the minimal-hop path. According to the feature of the network and the traffic distributions, the control strategy can be defined as "the candidate path (non-minimal-hop path) can be utilized only if its link utilization is less than 80% and its extra hop is not greater than 1". For current QoS routing algorithm, it is impossible to incorporate such a control strategy. But in the embodiment of method of the invention, the Util_weight can be calculated with n=1, m=1 and $U_{max}$=0.8. Based on this Util_weight, when the maximal link utilization of path A-C-B is less than 80%, the path A-C-B will be chosen. Otherwise, when the maximal link utilization of path A-D-E-B is less than 60%, path A-D-E-B will be chosen. In other cases, the traffic will be refused to be routed. We can see from this example that, in the method of this invention, the "non-minimal-hop paths" are limited based on their maximal link utilizations. In this example, at least 20% of the bandwidth is reserved for the future connections between node A and node C or between node C and node B. For the same network, if the control strategy is changed to reserve more bandwidth for the future connections, all needed to do is just determining a smaller $U_{max}$, recalculating the Util_weight and assigning the value to this ingress-egress pair.

In short, by applying Util_weight, the lower limit for selecting "non-minimal-hop paths" can be determined based on their number of hops and maximal link utilizations. The condition for a path longer than (specified by m) the "worst" path to be selected is that: the load of this path is lighter than that of the "worst" path (specified by $U_{max}$).

By applying Util_weight in the shortest-distance routing algorithm, the throughput between an ingress-egress pair is no longer restricted by the bandwidth of the minimal-hop path. At the same time, the allocation of the network resources to non-minimal-hop paths is controlled dynamically based on the condition of network and control strategies.

According to the operator's requirement, the same control strategies can be applied to the whole network (n is defined as the mean hop number of the minimal-hop path in the network), or different control strategies can be deployed for individual ingress-egress pairs. Furthermore, even for a single ingress-egress pair, the operator can deploy different control strategies for traffics with different priorities to support multi-level QoS routing The Second Embodiment In the second embodiment, the strategy-based path selection method of the invention is embodied in the path selection apparatus for dynamic load balancing.

If the invention is applied to the dynamic load balancing for best-effort traffic, the definition of Util_weight is different because the dynamic load balancing is for relieving the congestion of links. In dynamic load balancing, a threshold for link utilization is defined. Once the utilizations of some links exceed this threshold, the paths over these links are considered to be congested, and part of traffic over these paths will be "rebalanced" to candidate paths, so that the utilizations of the congested paths decrease under the threshold. Therefore, in path selection algorithm for dynamic load balancing, it is important that the candidate paths never pass through the links whose utilizations exceed the threshold. Otherwise, the congestion can not be relieved. However, in current shortest-distance routing algorithms, it can not be avoided that the candidate paths pass through congested links with utilization higher than the threshold, as the algorithms do not take the threshold specified by user into consideration.

In the invention scheme, the Util_weight is applied to incorporate the user specified threshold into path selection, the link cost is calculated as follows:

$$C_{link} = \begin{cases} \frac{1}{1 - \text{Util\_weight} \times U_{link}}, & \text{Util\_weight} \times U_{link} < 1 \\ \text{Max\_Cost}, & \text{Util\_wieght} \times U_{link} \geq 1 \end{cases}$$

From this function we can see that, for link with utilization larger than $$\frac{1}{\text{Util\_weight}},$$

the cost is set as Max Cost, which is a very large number. Therefore a threshold $$\frac{1}{\text{Util\_weight}}$$

is set for link utilization. If the utilization of a link is equal to or larger than this threshold, the paths via this link will not be selected for load balancing for its high link cost. By setting $$\text{Util\_weight} = \frac{1}{\text{High\_threshold}}$$

Figure 5:
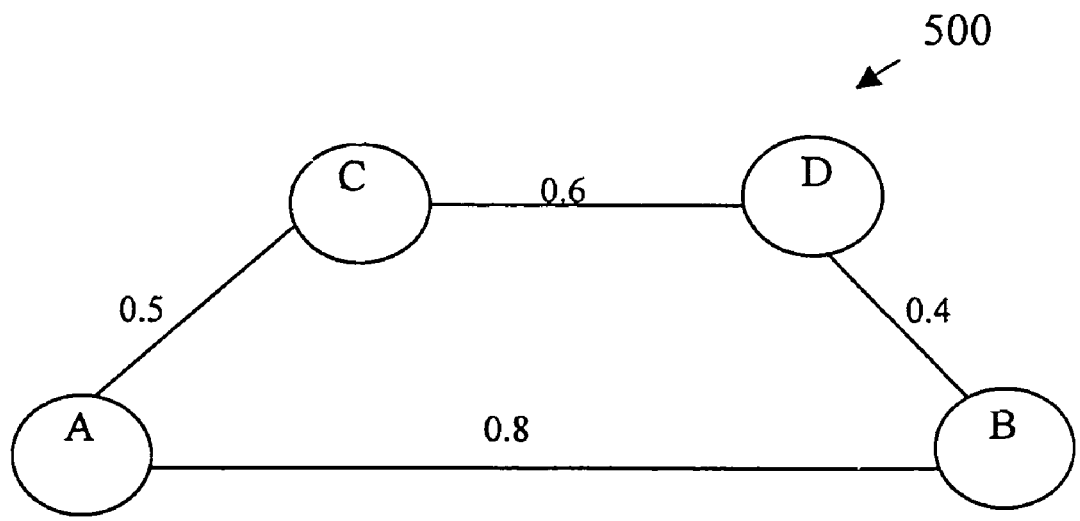
FIG. 5 illustrates an application of the invention where the control strategy is applied to path selection for best-effort traffic.

(High_threshold is a threshold defined by the operator for dynamic load balancing), it can be ensured that the dynamic load balancing utilizes all paths with the utilization lower than the threshold to relieve the congestion. FIG. 5 shows an example of applying the strategy-based path selection to control the dynamic load balancing. In this example, the threshold specified by the operator is 70%, by setting Util_weight=1/0.7=1.43, it can be ensured that paths with link utilization larger than 70% will not be determined as candidate path.

The embodiments of applying the invention to QoS traffic and best-effort traffic have been described above. On the other hand, when the network has a large physical span, sometimes hop limitation is also a factor to be considered in dynamic load balancing. It is because in such networks, there is the possibility that the increased propagation delay incurred by lengthened path may exceed the decreased queuing delay due to bypassing the congestion, which makes the total delay even larger. When deploying dynamic load balancing in such networks, analysis similar to that for QoS routing can be made, and smaller Util_weight can be applied to limit the hop number. In this case, the condition for dynamic load balancing to be effected is that, the maximal link utilization in the network reaches the specified threshold, and there exists paths satisfying the constraints defined by the strategies in the network.

Furthermore, by assigning different Util_weights to individual links, strategy-based routing can be easily deployed for different level of traffics. As an example, best-effort traffic is controlled in dynamic load balancing scheme, while traffics with high priorities are routed through explicit paths over MPLS. Considering the priorities of the traffics, it is desired that the traffics with high priorities are routed through the minimal-hop paths. In this case, a relatively large Util_weight can be set for the link in the minimal-hop paths, so that the minimal-hop paths are kept to be light loaded with respect to best-effort traffic, so as to preserve more bandwidth for traffics with higher priorities. For example, Util_weight=1000 can be set for a link, so that this link will not be utilized for best-effort traffics.

Although the method and apparatus for path selection of the invention have been described above in a illustrative way, it would be appreciated that the invention is not limited thereto, instead the scope of the invention is defined only by the claims attached below. Meanwhile, various modifications can be made within the scope defined by the claims.

We claim:

1. A method for path selection by a path selecting apparatus in a telecommunication network, the method comprising:
  (a) defining a control strategy, and generating a control strategy parameter Util_weight based on the control strategy by control strategy parameter generating means;
  (b) generating a network condition parameter based on the condition of the network by network condition parameter generation means, the network condition parameter being link utilization $U_{link}$;
  (c) calculating a path cost for each of a plurality of candidate paths based on said control strategy parameter, said network condition parameter, and network topology information by path cost calculating means; and
  (d) selecting a path with the minimal path cost from the candidate paths by path determining means, wherein said calculating operation (c) comprises:
    calculating a link cost $C_{link}$ for each of the links included in a path based on said control strategy parameter Util_weight and said link utilization $U_{link}$; and
    summating the link costs $C_{link}$ of all the links included in the path as said path cost, wherein
  in the case of QoS routing, said link cost $C_{link}$ is calculated with the equation of:

$$C_{link} = \frac{1}{1 - \text{Util\_weight} \times U_{link}},$$

and wherein
  the path selecting apparatus functions as the control strategy parameter generating means, the network condition parameter generation means, the path cost calculating means, and the path determining means.

2. The method of claim 1, further comprises:
  setting the maximal link utilization in a path as the link utilization for each respective link in the path by the path cost calculating means.

3. A method for path selection by a path selecting apparatus in a telecommunication network, the method comprising:
  (a) defining a control strategy, and generating a control strategy parameter Util_weight based on the control strategy by control strategy parameter generating means;
  (b) generating a network condition parameter based on the condition of the network by network condition parameter generation means, the network condition parameter being link utilization $U_{link}$;
  (c) calculating a path cost for each of a plurality of candidate paths based on said control strategy parameter, said network condition parameter, and network topology information by path cost calculating means; and
  (d) selecting a path with the minimal path cost from the candidate paths by path determining means, wherein said calculating operation (c) comprises:
    calculating a link cost $C_{link}$ for each of the links included in a path based on said control strategy parameter Util_weight and said link utilization $U_{link}$; and
    summating the link costs $C_{link}$ of all the links included in the path as said path cost, wherein
  in the case of dynamic load balancing for best-effort traffic, said link cost $C_{link}$ is calculated with the equation of:

$$C_{link} = \begin{cases} \dfrac{1}{1 - \text{Util\_weight} \times U_{link}}, & \text{Util\_weight} \times U_{link} < 1 \\ \text{Max\_Cost}, & \text{Util\_wieght} \times U_{link} \geq 1 \end{cases}$$

where Max_cost is a predetermined constant, and wherein
  the path selecting apparatus functions as the control strategy parameter generating means, the network condition parameter generation means, the path cost calculating means, and the path determining means.

4. The method of claim 1, wherein said control strategy parameter Util_weight is generated based on at least one of a threshold for hop number of the path and a threshold for link utilization.

5. The method of claim 4, wherein in the case of QoS routing, said control strategy parameter Util_weight is generated with the equation of:

$$\text{Util\_weight} = \frac{m}{(m+n) - n \cdot U_{max}}$$

where n is the number of hops in the minimal-hop path among the candidate paths, m is the difference between said threshold for hop number of the path and n, and $U_{max}$ is said threshold for link utilization.

6. The method of claim 4, wherein in the case of the dynamic load balancing for best-effort traffic, said control strategy parameter Util_weight is generated with the equation of:

$$\text{Util\_weight} = \frac{1}{U_{\max}}$$

where $U_{max}$ is said threshold for link utilization.

7. The method of claim 1, wherein said control strategy is defined in any one of the schemes of:
the same strategy being applied to the whole network;
different strategies being applied to different ingress-egress pairs; and
different strategies being applied to traffics of different levels in a single ingress-egress pair.

8. An apparatus for path selection in a telecommunication network, comprising:
a control strategy parameter generating means for generating a control strategy parameter Util_weight based on a control strategy;
a network condition parameter generating means for generating a network condition parameter based on the condition of the network;
a path cost calculating means for calculating a path cost for each of a plurality of candidate paths based on said control strategy parameter, said network condition parameter and network topology information; and
a path determining means for selecting a path with the minimal path cost from the candidate paths, wherein
the network condition parameter generating means monitors and logs link utilization $U_{link}$ of each link in the network as said network condition parameter,
the path cost calculating means calculates a link cost $C_{link}$ for all of the links included in the path based on said control strategy parameter Util_weight and said link utilization $U_{link}$, and summates the link costs of all the links included in the path as said path cost, and
wherein in the case of QoS routing, the path cost calculating means calculates the link cost $C_{link}$ with the equation of:

$$C_{link} = \frac{1}{1 - \text{Util\_weight} \times U_{link}}.$$

9. The apparatus of claim 8, wherein the path cost calculating means sets the maximal link utilization in a path as the link utilization for each respective link in the path.

10. An apparatus for path selection in a telecommunication network, comprising:
a control strategy parameter generating means for generating a control strategy parameter Util_weight based on a control strategy;
a network condition parameter generating means for generating a network condition parameter based on the condition of the network;
a path cost calculating means for calculating a path cost for each of a plurality of candidate paths based on said control strategy parameter, said network condition parameter and network topology information; and
a path determining means for selecting a path with the minimal path cost from the candidate paths, wherein
the network condition parameter generating means monitors and logs link utilization $U_{link}$ of each link in the network as said network condition parameter,
the path cost calculating means calculates a link cost $C_{link}$ for all of the links included in the path based on said control strategy parameter Util_weight and said link utilization $U_{link}$, and summates the link costs of all the links included in the path as said path cost, and
wherein in the case of dynamic load balancing for best-effort traffic, the path cost calculating means calculates the link cost $C_{link}$ with the equation of:

$$C_{link} = \begin{cases} \dfrac{1}{1 - \text{Util\_weight} \times U_{link}}, & \text{Util\_weight} \times U_{link} < 1 \\ \text{Max\_Cost}, & \text{Util\_weight} \times U_{link} \geq 1 \end{cases}$$

where Max_cost is a predetermined constant.

11. The apparatus of claim 8, wherein the control strategy parameter generating means generates said control strategy parameter based on at least one of a threshold for hop number of the path and a threshold for link utilization.

12. The apparatus of claim 8, wherein in the case of QoS routing, the control strategy parameter generating means generates said control strategy parameter Util_weight with the equation of:

$$\text{Util\_weight} = \frac{m}{(m+n) - n \cdot U_{max}}$$

where n is the number of hops of the minimal-hop path in the candidate paths, m is the difference between said threshold for hop number of the link and n, and $U_{max}$ is said threshold for link utilization.

13. The apparatus of claim 8, wherein in the case of the dynamic load balancing for best-effort traffic, the control strategy parameter generating means generates said control strategy parameter Util_weight with the equation of:

$$\text{Util\_weight} = \frac{1}{U_{max}}$$

where $U_{max}$ is said threshold for link utilization.

* * * * *